(12) United States Patent  
Weger (10) Patent No.: US 7,852,013 B2  
(45) Date of Patent: Dec. 14, 2010

(54) ELECTRONIC STABILIZER CIRCUIT FOR SUPPRESSING STARTUP INSTABILITIES IN COLD CATHODE FLUORESCENT LAMPS

(75) Inventor: Robert Weger, Wels (AT)

(73) Assignee: Minebea Co., Ltd., Nagano-ken (JP)

( * ) Notice: Subject to any disclaimer, the term of this patent is extended or adjusted under 35 U.S.C. 154(b) by 579 days.

(21) Appl. No.: 12/004,528

(22) Filed: Dec. 21, 2007

(65) Prior Publication Data

US 2009/0160349 A1 Jun. 25, 2009

(51) Int. Cl.  
*H05B 37/00* (2006.01)

(52) U.S. Cl. .................. 315/219; 315/291; 315/307

(58) Field of Classification Search ............. 315/209 R, 315/DIG. 5, DIG. 7, 291, 246, 248, 307, 315/219  
See application file for complete search history.

(56) References Cited

U.S. PATENT DOCUMENTS

| 6,456,015 B1 * | 9/2002 | Lovell et al. .................. 315/248 |
| 2009/0085492 A1 * | 4/2009 | Siessegger .............. 315/209 R |

* cited by examiner

*Primary Examiner*—David Hung Vu  
(74) *Attorney, Agent, or Firm*—Cooper & Dunham LLP (57) ABSTRACT

According to the present invention an electronic stabilizer circuit for suppressing startup instabilities when supplying a cold cathode fluorescent lamp with current is proposed which is connected in series with a power supply line of the cold cathode fluorescent lamp. The stabilizer circuit has variable impedance which is automatically adjusted depending on the magnitude of the lamp current thus limiting the lamp current to a certain current threshold.

15 Claims, 6 Drawing Sheets

ELECTRONIC STABILIZER CIRCUIT FOR SUPPRESSING STARTUP INSTABILITIES IN COLD CATHODE FLUORESCENT LAMPS

FIELD OF THE INVENTION

The invention relates to an electronic stabilizer circuit for suppressing startup instabilities in cold cathode fluorescent lamps (CCFLs).

STATE OF THE ART

CCFLs are used for example in liquid crystal displays (LCDs) as wide-coverage light sources for backlighting these displays. The specific requirements for those backlighting light sources are uniform light emission over the entire surface and a high light yield. In a display unit of a flat screen (LCD) according to the current prior art, behind the fluid crystal unit there is a diffuser plate for light and behind this a plurality of CCFLs, disposed in a regular fashion.

Power supply circuits for cold cathode fluorescent lamps, usually called backlight inverter circuits, frequently suffer from an effect known as startup instability. The startup instability causes acoustic noise emitted by the magnetic components of the power supply circuit and provides a serious nuisance during the first minute of lamp operation particularly in a cold environment.

The reason for the startup instability can be found in the negative incremental impedance of the CCFLs. This negative impedance favours subharmonic oscillations resulting in a modulation of the lamp current amplitude. The startup instability is predominant at low temperatures as the cold plasma has bigger negative incremental impedance as a hot one.

The subharmonic oscillations can be removed by bringing in additional loss mechanisms, for example by putting sufficient series resistance to the fluorescent lamp so that the negative incremental lamp impedance is outweighed by the positive resistance of the resistor. In other words the resistor damps down the subharmonic oscillation. Unfortunately the resistor loads equally the ordinary operating current resulting in a considerable loss of efficiency.

DISCLOSURE OF THE INVENTION

The objective of the present invention is to provide a simple selective damping circuit affecting only the subharmonic oscillation, but not loading the regular stable operation and thus avoiding the high loss in efficiency of a traditional resistor solution.

The present invention introduces an electronic circuit which is connected in series with one CCF-lamp and the power supply line or with a group of CCF-lamps and the power supply line. This stabilizer circuit damps down only such lamp current amplitudes which are exceeding a certain limit. The stabilizer circuit remains low impedant below a certain current threshold and increases its resistance significantly when the current through the circuit exceeds this threshold. So the stabilizer circuit behaves like a low impedant resistor at low currents until the current reaches the threshold. Beyond this current threshold the resistance of the stabilizer circuit increases quickly showing a current source behaviour. So the stabilizer circuit may be characterized best as an active current limiter.

Preferred embodiments and further advantageous characteristics of the invention are outlined in the dependent claims.

Generally, cold cathode fluorescent lamps are driven with an alternating supply current. Thus the stabilizer circuit must be designed for alternating current.

The kernel of the stabilizer is a DC-current limiter circuit comprising at least one bipolar transistor with a base resistor Rb and an emitter resistor Re and one Zenerdiode defining the current threshold level and a second Zener diode in parallel to the base resistor providing an overvoltage protection for the transistor. This kernel can do its job only for one current direction (e.g. for the positive half-wave). For the opposite current direction the circuit is conducting via the two forward biased Zener diodes. In order to achieve current limiter operation for both the positive and the negative half-wave, two different embodiments are given. In the first one the current limiter circuit is placed in the diagonal of a full-wave rectifier bridge. In the second one two identical current limiter circuits are connected in series but in reverse polarity so that one limits the positive and the other one limits the negative half-wave.

For handling a higher lamp current the stabilizer circuit may comprise a current limiter comprising two bipolar transistors connected in a Darlington configuration. Again the AC-functionality can be achieved by using the circuit within a full bridge rectifier bridge or by employing two identical circuits in series connection and in reverse polarity.

In another preferred embodiment of the invention the stabilizer circuit is based on a field effect transistor and a resistor network forming a voltage divider for biasing the gate of the field effect transistor, wherein the field effect transistor is operated as a voltage controlled current limiter.

The AC-functionality again is achieved in combination with a full bridge rectifier circuit or alternatively by using two identical circuits in series but with reverse polarities.

The incremental resistance of a cold cathode fluorescent lamp is highly temperature dependent and so is the start-up instability. Therefore it is useful to make the current threshold of the current limiter also temperature dependent by a temperature dependent resistor. In particular the threshold needs to rise with temperature.

The stabilizer circuit can be connected in series with one lamp or with a plurality of cold cathode fluorescent lamps.

According to a preferred embodiment of the invention the stabilizer circuit is part of a power supply circuit comprising a transformer with at least one primary winding and at least one secondary winding, wherein the cold cathode fluorescent lamp and the stabilizer circuit are connected in series with the secondary winding of the transformer.

According to another preferred embodiment of invention the stabilizer is part of a power supply circuit comprising a transformer with at least one primary winding and at least one secondary winding, wherein the stabilizer circuit is connected in series with the primary winding of the transformer and the cold cathode fluorescent lamp is connected in series with the secondary winding of the transformer.

If required two or more stabilizer circuits can be connected in series. This may be useful if the voltage rating of the transistors is low or if the power dissipation needs to be distributed to more components.

The stabilizer circuit and its method of operation, together with additional issues and advantages thereof, will be best understood from the following description of specific embodiments of the invention when read in connection with the accompanying drawings.

DETAILED DESCRIPTION OF PREFERRED
EMBODIMENTS OF THE INVENTION

Figure 1A:
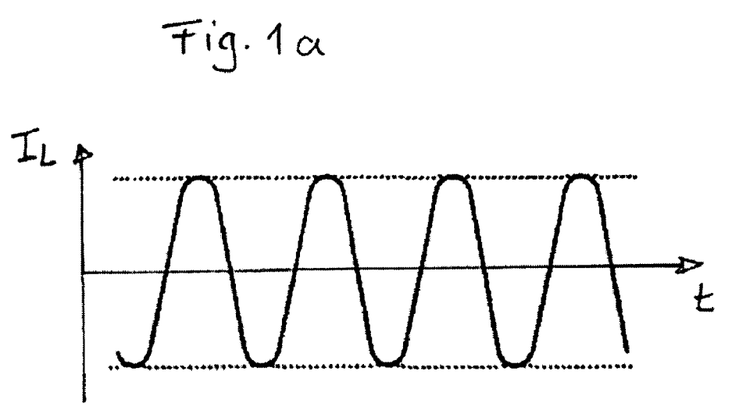
FIG. 1a schematically shows a time diagram of the supply current of a CCFL during stable operation.
Figure 1B:
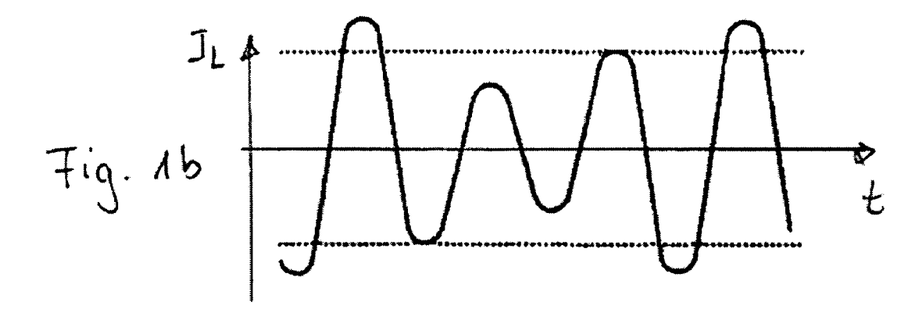
FIG. 1b schematically shows a time diagram of the supply current of a CCFL during start-up operation.

FIGS. 1a and 1b show the problem and introduce the basic idea of the invention. Cold Cathode Fluorescent Lamps (CCFLs) are generally powered by alternating voltage of about 1000 Volts and are operated at high frequencies up 30 to 50 kHz. At stable operation, as shown in FIG. 1a, a CCFL is operated at a constant lamp current $I_L$ of several milliamperes. During start-up often instable operation is observed which is mainly due to the negative incremental impedance of the CCFL. This negative impedance favours subharmonic oscillations and modulates the amplitude of the lamp current $I_L$ as shown in FIG. 1b. The subharmonic oscillation causes the amplitude of the lamp current $I_L$ to change on consecutive waves. The high frequency lamp current $I_L$ is modulated with a lower frequency. The low frequency oscillation often is accompanied by acoustic noise during the start-up of lamp operation in particular in a cold environment.

Figure 2:
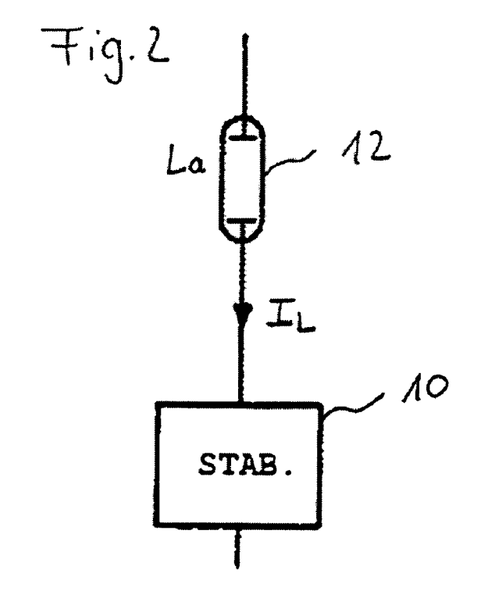
FIG. 2 schematically shows the connection of the stabilizer circuit in series with a CCFL.

To solve this problem the invention proposes an electronic stabilizer circuit. As shown in FIG. 2 the electronic stabilizer circuit 10 is connected in series with the fluorescent lamp 12 and provides a selective damping $I_L$ for the highest amplitudes. The stabilizer circuit 10 is low impedant as long as the lamp current $I_L$ through the circuit remains below a certain current threshold. A reasonable value for the threshold might be the averaged current amplitude of the lamp current $I_L$. As soon as the current exceeds the threshold the stabilizer circuit 10 turns from low impedance to high impedance creating a considerable voltage drop which reduces the current $I_L$ through the lamp 12. So the stabilizer circuit 10 extracts energy mainly from the high current amplitudes of the lamp current $I_L$. In case the current limit is set close to the nominal operating current peak value (the current amplitude) only the subharmonic overshoots of the lamp current $I_L$ are damped. At normal stable operation the damping by the stabilizer circuit gets very small.

Figure 3:
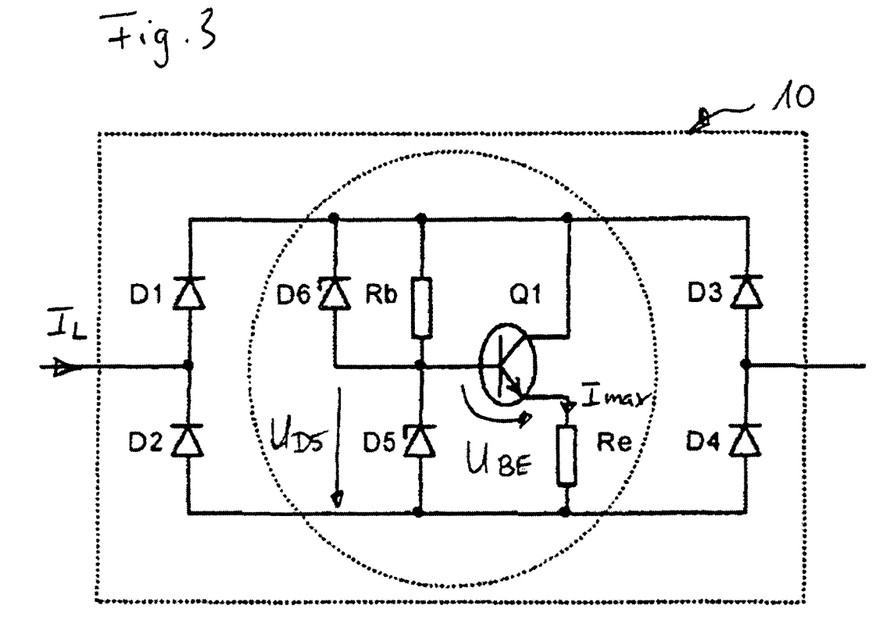
FIG. 3 schematically shows a first embodiment of a stabilizer circuit based on a bipolar transistor and a Zener diode FIG. 4 schematically shows a second embodiment of a stabilizer circuit based on two bipolar transistors and Zener diodes.

FIG. 3 shows a first embodiment of a stabilizer circuit 10 according to the invention. The stabilizer circuit 10 consists of a Zener diode D5 providing a reference voltage and a bipolar NPN transistor Q1 for handling the lamp current. There are four diodes D1, D2, D3 and D4 providing full wave rectification of the alternating lamp current $I_L$ feeding both current half-waves in the same direction through the transistor Q1. The transistor Q1 operates as a current limiter. The current limit is set by the Zener voltage of diode D5 and the value of the resistor Re connected to the emitter of Q1. The Zener diode D5 is connected in series with a resistor Rb between the positive and the negative terminal of the circuit. The resistor Rb provides the current for the Zener diode D5 and the base of the transistor Q1. The collector of Q1 is connected to the positive terminal of the circuit and the emitter of Q1 is connected to a terminal of the resistor Re which other terminal is connected to the negative terminal of the circuit. The Zener diode D5 provides a reference voltage $U_{D5}$ at the base of transistor Q1 which corresponds to the Zener voltage. Also the voltage drop $U_{BE}$ between the base and the emitter of transistor Q1 has to be considered. Accordingly, the maximum voltage at the emitter of Q1 is $U_{D5}-U_{BE}$. The maximum current flowing through the transistor Q1 (current threshold) is therefore limited to $I_{max}=(U_{D5}-U_{BE})/R_e$. As long as the lamp current $I_L$ is below the predefined limit $I_{max}$, the transistor Q1 is low impedant, i.e. the collector-emitter voltage $U_{CE}$ is low. When the lamp current $I_L$ reaches the predefined limit, the transistor Q1 gets high impedant, i.e. $U_{CE}$ rises, in order to limit the current through the transistor to $I_{max}$. If the current limit $I_{max}$ is set around the nominal operating current peak of the lamp current $I_L$, the circuit will only damp the current overshoots, as shown in FIG. 1. The additional Zener diode D6 provides overvoltage protection for the transistor Q1.

Figure 4:
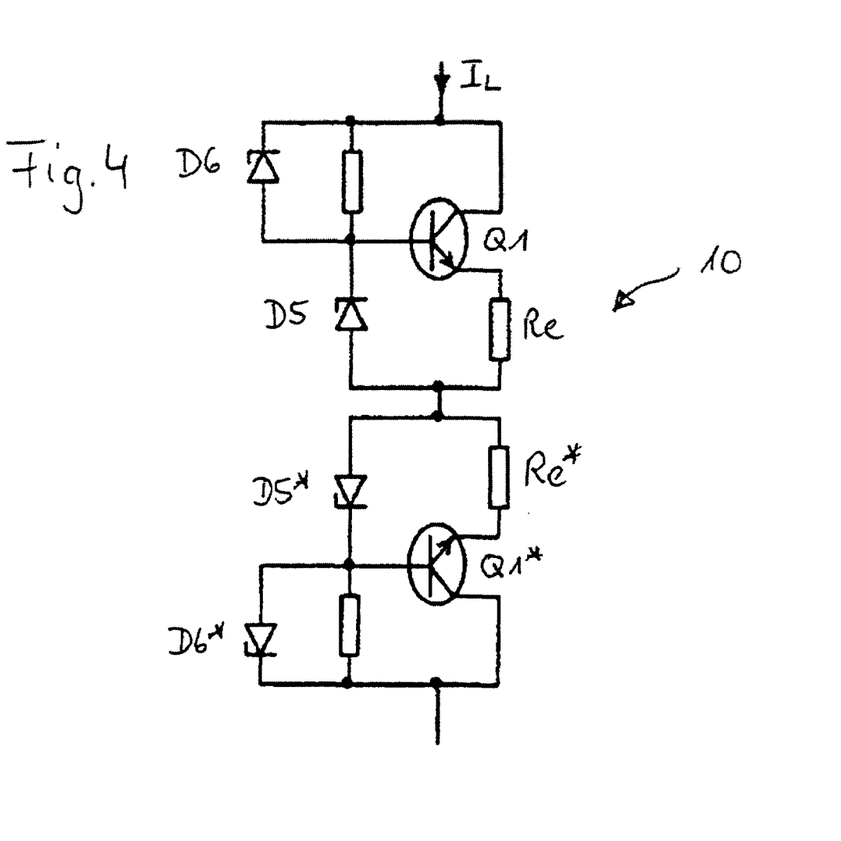

FIG. 4 depicts another embodiment of a stabilizer circuit 10 based on the circuit of FIG. 3. This stabilizer circuit consists of two identical half-wave limiters connected in series, one working on the positive half-wave of the input lamp current $I_L$ and the other on the negative half-wave of the input lamp current $I_L$. The positive half-wave is limited by Q1 and bypasses Q1* through the now forward biased Zenerdiodes D5* and D6*. The negative half-wave of the input current bypasses the transistor Q1 through the Zenerdiode D5 and the Zenerdiode D6 and is limited by Q1*. The advantage of the circuit of FIG. 4 is that the power dissipation is shared between the two transistors Q1 and Q1* and that the four rectifier diodes become redundant.

Figure 5:
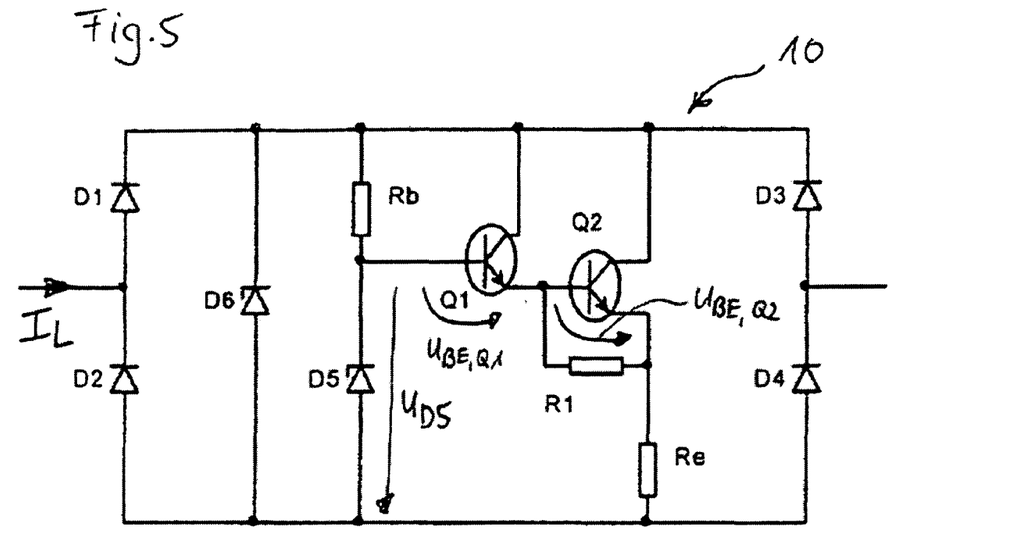
FIG. 5 schematically shows a third embodiment of a stabilizer circuit similar to FIG. 1 using a Darlington transistor configuration.

In particular when higher lamp currents $I_L$ are required, the performance of the circuit of FIG. 3 can be improved by using an NPN Darlington transistor configuration with two transistors Q1 and Q2 as shown in FIG. 5. The Darlington circuit maintains a sufficient transistor amplification factor also for a higher lamp current. The current threshold is calculated to $$I_{max}=(U_{D5}-U_{BE,Q1}-U_{BE,Q2})/Re.$$

The Darlington version of the stabilizer circuit shown in FIG. 5 makes use of the diode rectifier (D1-D4) to facilitate AC-operation. Certainly it is also possible to use two identical Darlington circuits at reversed polarity in series connection as explained earlier according to FIG. 4.

The above introduced stabilizer circuits 10 need to be designed for a particular operating current of the CCFL 12. So if the circuit is designed for 10 mA maximum lamp current $I_{max}$ it would have no stabilizing effect at 8 mA and it would create enhanced power losses at 12 mA nominal lamp peak current. This is disadvantageous for some applications.

However this drawback can be overcome by the following embodiment of a stabilizer circuit 10.

Figure 6:
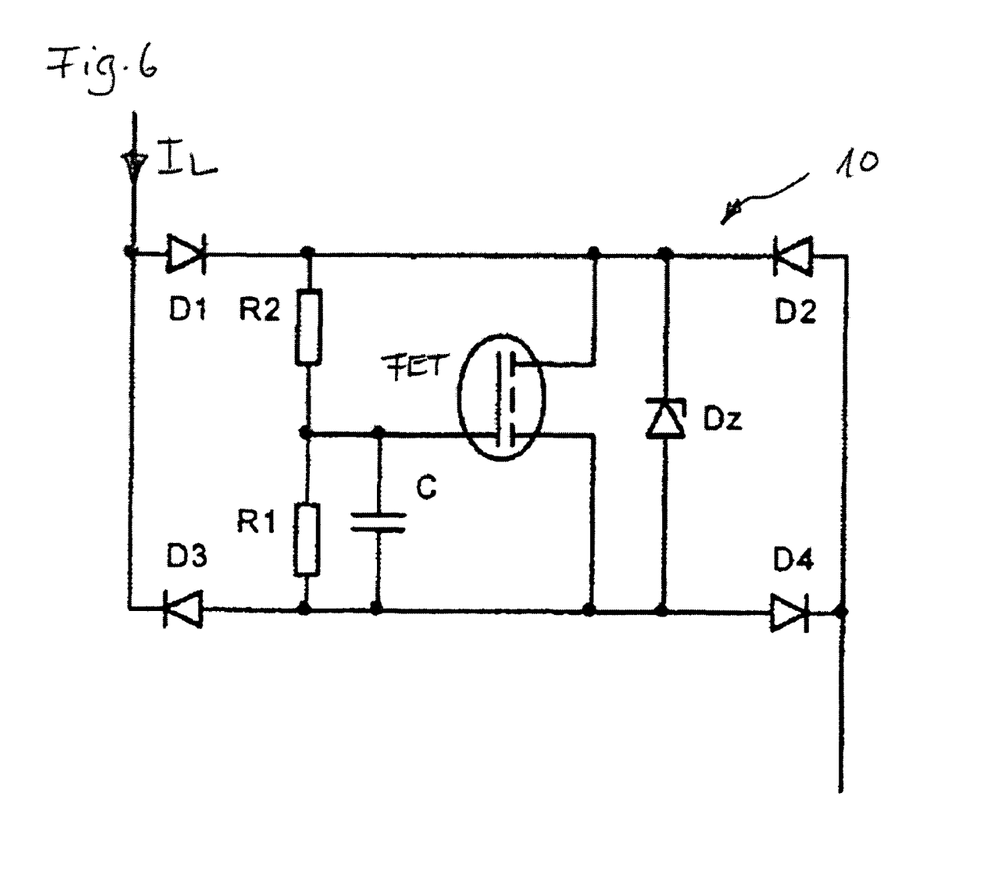
FIG. 6 schematically shows a fourth embodiment of a stabilizer circuit based on a FET.

FIG. 6 shows a stabilizer circuit 10 based on a field effect transistor (FET). The diodes D1, D2, D3 and D4 provide full wave rectification of the input alternating lamp current $I_L$ feeding both current half-waves in the same direction through the FET. There is a voltage divider consisting of the resistors R1 and R2 connected between the positive and the negative terminal of the circuit. The gate of the FET is connected to the center tap of the voltage divider R1/R2. The drain of the FET is connected to the positive terminal of the circuit and the source of the FET is connected to the negative terminal of the circuit. The FET is operated as a voltage programmed current limiter. The higher the input voltage at the gate of the FET the higher is the current threshold. For currents below this threshold the Drain-Source-resistance is small, for currents above the threshold the resistance is rising quickly. The big advantage of the FET-stabilizer over the bipolar stabilizer is the dynamic change of the threshold. That means the FET stabilizer does not need to be designed for a certain operating current. This circuit is self adjusting to any lamp current. The resistor ratio R1/R2 determines the intensity of damping respectively the overall circuit losses. The capacitor C fixes the response time of the circuit. The Zener Diode Dz connected between the positive and negative terminal of the circuit provides overvoltage protection.

Figure 7:
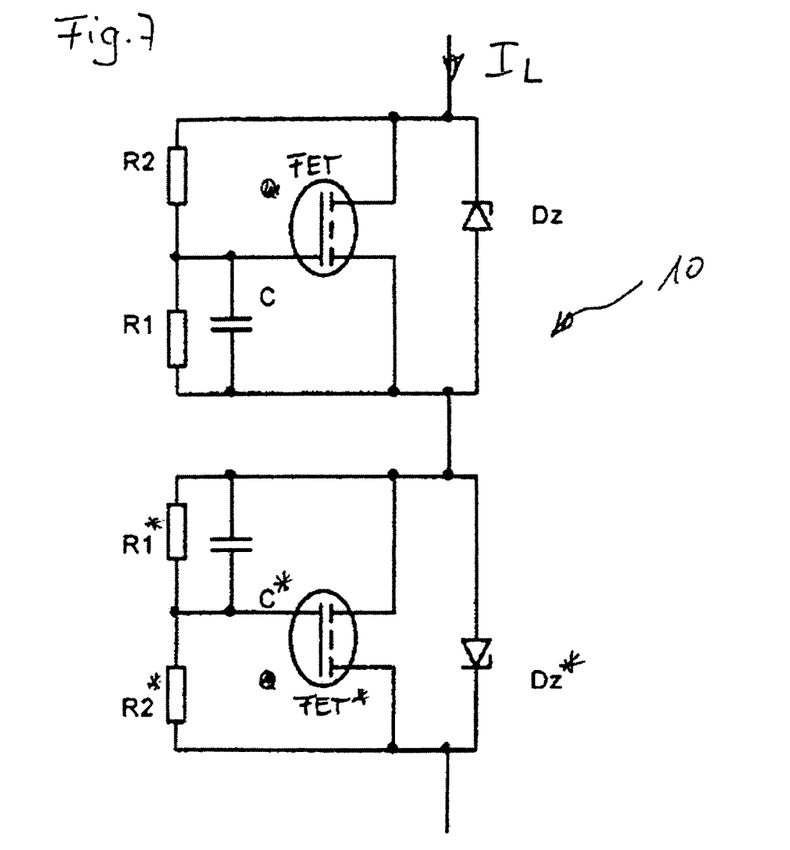
FIG. 7 schematically shows a fifth embodiment of a stabilizer circuit based on two FETs.

FIG. 7 depicts an alternative embodiment of a stabilizer circuit 10 based on the circuit of FIG. 6. The circuit consists of two identical half-wave current limiters, one working on the positive half-wave of the input lamp current $I_L$ and the other on the negative half-wave of the input current. The advantage of the circuit of FIG. 7 again is that the total power dissipation is shared between the two FETs and that the diodes D1 to D4 become redundant The above discussed stabilizer circuits 10 fight the current modulation which is more severe at lower ambient temperatures. So it is advantageous if the stabilizing performance of the circuit is made temperature dependent. This can be achieved by lowering the current limit of the stabilizer circuit at lower temperatures. The intrinsic thermal drift of the Gate-threshold voltage of a FET already provides such a feature but only to a low extent. However any desired temperature dependence may be designed using a temperature dependent resistor for the resistors R2 or R1.

Figure 8:
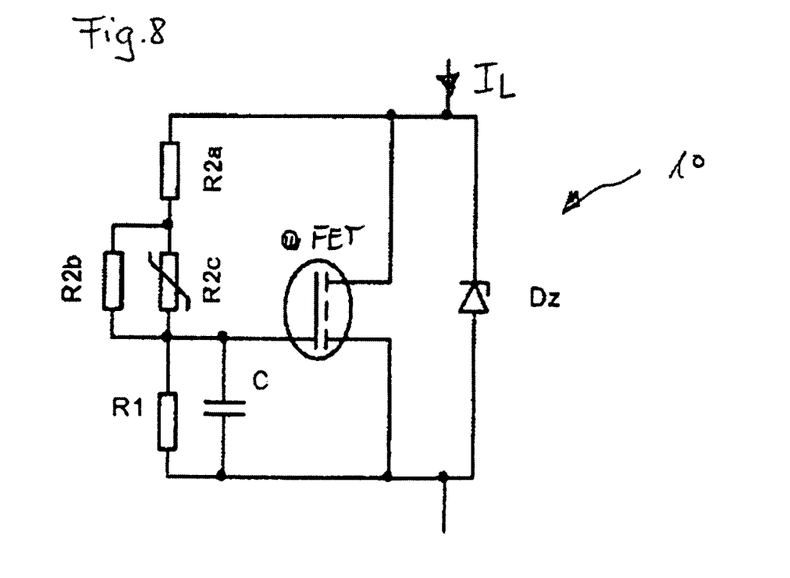
FIG. 8 schematically shows a sixth embodiment of a stabilizer circuit similar to FIG. 6 with temperature compensation of the nominal current.

FIG. 8 gives an example for modifying the resistor R2 of the circuit of FIG. 6 by using an NTC-resistor. Resistor R2 of FIG. 6 is replaced by two resistors R2a and R2b connected in series. A NTC resistor R2c is connected in parallel with resistor R2b. The resistance of R2c is high at low temperatures and decreases when the temperature is rising. Thus, the gate voltage is rising with temperature and so is the current threshold of the stabilizer circuit.

The temperature dependent circuit elements of the stabilizer circuit shown in FIG. 8 can be applied to any of the above FET-stabilizer circuits, FIGS. 6 and 7.

The stabilizer circuits 10 shown in the various embodiments of the invention are intended to be connected in series with one lamp or in series with a group of lamps.

Figure 9:
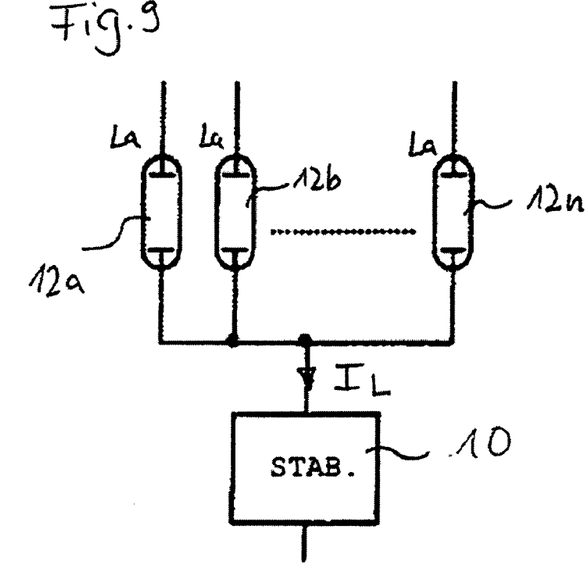
FIG. 9 schematically shows the connection of the stabilizer circuit in series with a group of CCFLs connected in parallel with each other.

As shown in FIG. 9 the electronic stabilizer circuit 10 can be connected in series with a set of fluorescent lamps 12a, 12b, ..., 12n. The stabilizer current $I_L$ is then the overall current flowing through all lamps.

Figure 10:
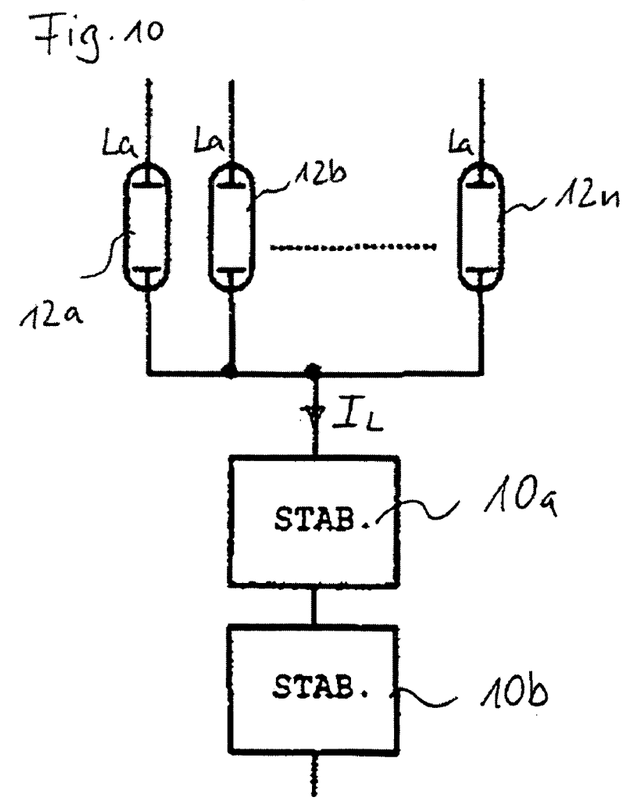
FIG. 10 schematically shows the connection of two stabilizer circuits in series with a group of CCFLs connected in parallel.

Two or more stabilizer circuits 10a and 10b can easily be connected in series as shown in FIG. 10.

Figure 11:
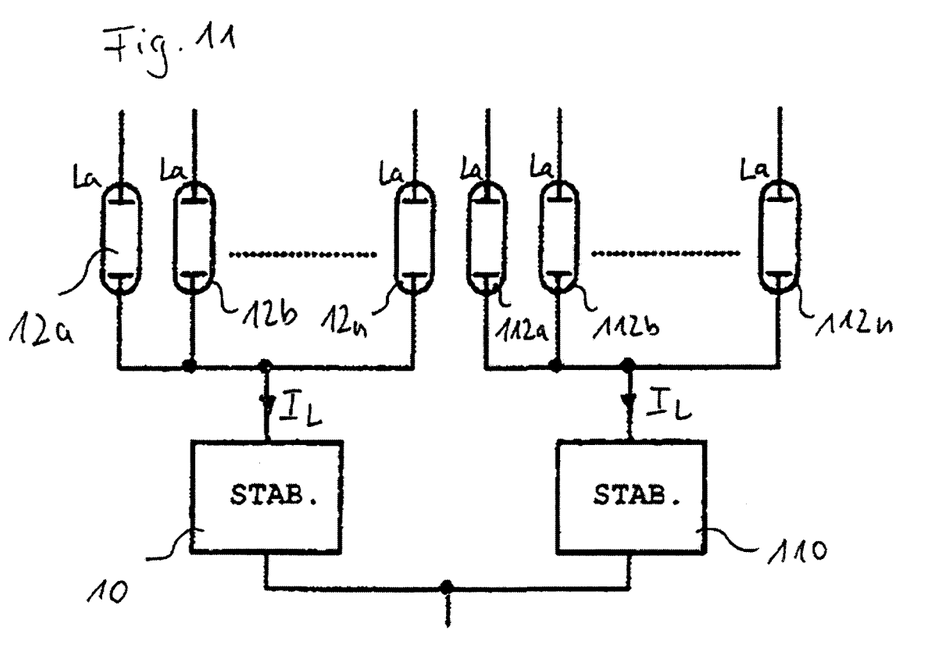
FIG. 11 schematically shows the connection of two stabilizer circuits, each of which is connected in series with a group of CCFLs connected in parallel.

As shown in FIG. 11, two or more stabilizer circuits 10 and 110 can be used on groups of lamps 12a, ..., 12n and 112a, ..., 112n. The stabilizer circuits 10 and 110 operate in parallel, wherein each is connected in series with a group of lamps 12a, ..., 12n and 112a, ..., 112n.

Certainly also combinations of the topologies shown in FIGS. 9 to 11 are possible.

Figure 12:
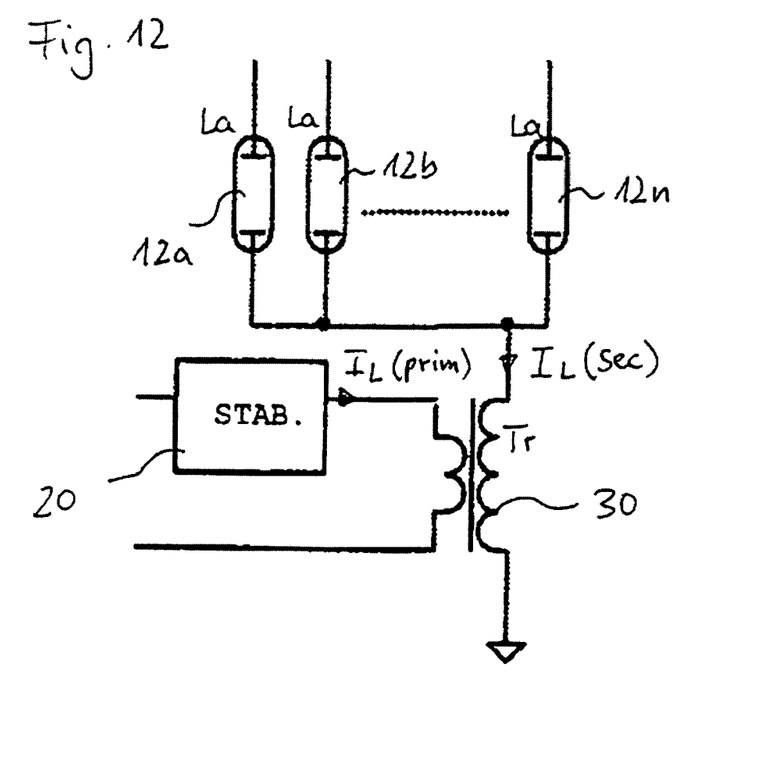
FIG. 12 schematically shows a stabilizer circuit connected in series to the primary side of a transformer used to supply a group of CCFLs at its secondary side.

In most applications the fluorescent lamps 12a, ..., 12n are powered by a transformer 30 to achieve the required high operating voltage. According to the above described embodiments the stabilizer circuit controls the lamp current connected in series with the lamp on the secondary side of the transformer. However in some cases it could be favourable to use a stabilizer circuit 20 on the primary side of the transformer 30. As shown in FIG. 12, the stabilizer circuit 20 is connected in series with the primary winding of the transformer 30. Thus it stabilizes the lamp current $I_L$ (prim) on the primary side of the transformer. When connected to the primary side of the transformer 30 the stabilizer circuit 20 must be able to handle less voltage but higher current as on the secondary side. The ratio is determined only by the transformation ratio of the transformer.

LIST OF REFERENCE NUMERALS 10, 10a, 10b Stabilizer Circuit
12, 12a-12n Cold Cathode Fluorescent Lamp (La)
20 Stabilizer Circuit
30 Transformer
110 Stabilizer Circuit
112a-112n Cold Cathode Fluorescent Lamp (La)

The invention claimed is:

1. An electronic stabilizer circuit (10) for suppressing start-up instabilities of a cold cathode fluorescent lamp (12), comprising the stabilizer circuit (10) connected in series with the cold cathode fluorescent lamp (12) and having a variable impedance which is automatically adjusted by the magnitude of the lamp current $I_L$, in such a way that only the current amplitudes which are exceeding a current threshold are damped.

2. An electronic stabilizer circuit according to claim 1, characterized in that it has a low impedance when the value of the lamp current $I_L$ is below a predetermined threshold value.

3. An electronic stabilizer circuit according to claim 2, characterized in that it turns to a high impedance when the value of the lamp current $I_L$ exceeds a predetermined threshold value.

4. An electronic stabilizer circuit according to claim 1, characterized in that the supply current is an alternating supply current.

5. An electronic stabilizer circuit according to claim 1, characterized in that it comprises at least one bipolar transistor and at least one Zener diode which are connected to a current limiter.

6. An electronic stabilizer circuit according to claim 5, characterized in that it comprises a current limiter for the positive half-wave of the alternating lamp current $I_L$ and an identical current limiter for the negative half-wave of the alternating lamp current $I_L$ connected in series.

7. An electronic stabilizer circuit according to claim 5, characterized in that it comprises a rectifier circuit for rectifying the lamp current $I_L$ before it is fed to the current limiter.

8. An electronic stabilizer circuit according to claim 5, characterized in that it comprises two bipolar transistors connected in a Darlington configuration.

9. An electronic stabilizer circuit according to claim 1, characterized in that it comprises at least one field effect transistor and a resistor network forming a voltage divider for biasing the gate of the field effect transistor, wherein the field effect transistor is operated as a voltage programmed current limiter.

10. An electronic stabilizer circuit according to claim 9, characterized in that it comprises a voltage programmed FET current limiter for the positive half-wave of the alternating lamp current $I_L$ and an identical voltage programmed FET current limiter for the negative half-wave of the alternating lamp current $I_L$ connected in series.

11. An electronic stabilizer circuit according to claim 9, characterized in that it comprises a rectifier circuit for rectifying the alternating lamp current $I_L$ before it is fed to the voltage programmed FET current limiter.

12. An electronic stabilizer circuit according to claim 1, characterized in that is comprises a temperature dependent component for adjusting the current threshold depending on the actual ambient temperature.

13. An electronic stabilizer circuit according to claim 1, characterized in that it is connected in series with a plurality of cold cathode fluorescent lamps (12a-12n).

14. An electronic stabilizer circuit according to claim 1, characterized in that it is part of a power supply circuit comprising a transformer (30) with at least one primary winding and at least one secondary winding, wherein the cold cathode fluorescent lamp (12a-12n) and the stabilizer circuit (10) are connected in series with the secondary winding of the transformer.

15. An electronic stabilizer circuit according to claim 1, characterized in that it is part of a power supply circuit comprising a transformer (30) with at least one primary winding and at least one secondary winding, wherein the stabilizer circuit (20) is connected in series with the primary winding of the transformer and the cold cathode fluorescent lamp (12a-12n) is connected in series with the secondary winding of the transformer.

* * * * *